United States Patent [19]

Rea

[11] Patent Number: 4,811,615

[45] Date of Patent: Mar. 14, 1989

[54] MECHANISM FOR ELIMINATING GEAR RATTLE IN A SHIFTABLE TRANSMISSION

[75] Inventor: Jeffrey E. Rea, Yorktown, Ind.

[73] Assignee: Borg-Warner Automotive, Inc., Troy, Mich.

[21] Appl. No.: 132,504

[22] Filed: Dec. 14, 1987

[51] Int. Cl.[4] ............................ F16H 57/12; F16H 3/08
[52] U.S. Cl. .......................................... 74/375; 74/409; 74/440
[58] Field of Search ................... 74/409, 440, 375, 411

[56] References Cited

U.S. PATENT DOCUMENTS

| | | | |
|---|---|---|---|
| 2,021,935 | 11/1935 | Griswold | 74/375 X |
| 2,663,198 | 12/1953 | Cairnes | 74/409 |

OTHER PUBLICATIONS

Product Engineering; "18 Ways to Control Backlash in Gearing", Fredrick T. Gutmann, 10-26-59, pp. 71-75.

Primary Examiner—Allan D. Herrmann
Attorney, Agent, or Firm—Robert L. Zieg; James J. Jennings; James A. Geppert

[57] ABSTRACT

A mechanism arranged in combination with a multiple ratio transmission for eliminating gear rattle in the various gear ratios and neutral position of the transmission. Such mechanism includes a gear network that is preloaded with a spring arrangement which imparts a spring torque to each gear mesh in the transmission. The spring torque provided by the spring arrangement has a magnitude greater than the inertia torque of the gear meshes arranged in the transmission and is capable of overcoming torsional acceleration imparted to those gear meshes.

7 Claims, 3 Drawing Sheets

MECHANISM FOR ELIMINATING GEAR RATTLE IN A SHIFTABLE TRANSMISSION

FIELD OF THE INVENTION

This invention relates to manually shiftable multi-ratio transmissions and, more particularly, to a mechanism for eliminating gear rattle in the various gear ratios and neutral position of such transmissions.

BACKGROUND OF THE INVENTION

Multiple ratio manually shiftable transmissions contain a plurality of intermeshing gear sets for providing the range of output torques needed for efficient vehicle operation. Each of the gear sets include at least two intermeshing gears. The teeth on such gears are precisely machined such that the tolerances therebetween are substantially eliminated, however a minimum of gear backlash is required. As with any machining process, however, a build-up of tolerance is unavoidable resulting in a range of gear backlash. Because the transmission is connectable to the engine, the torsional acceleration of the engine excites the rotating gears in the transmission causing them to vibrate within the range of backlash, thus creating gear rattle.

Various devices have been proposed to solve the gear rattle problem. One proposal involves using a brake-like device on the gears. Unfortunately, such devices add friction and, thus, heat to the transmission. Moreover, such devices steal torque from the system. Another proposal involves the use of a scissor gear mechanism. As those skilled in the art may appreciate, scissor gear devices are expensive. Moreover, scissor gear arrangements operate on only one gear set at a time. Accordingly, such approach requires a multiplicity of such devices thereby adding substantial costs to the transmission.

SUMMARY OF THE INVENTION

In view of the above and in accordance with the present invention, there is provided means for eliminating gear rattle in a shiftable transmission by preloading the transmission's gear meshes to overcome torsional acceleration. The present invention includes one or more operative assemblies arranged in combination with the transmission gear train for eliminating gear rattle in any gear ratio and neutral position. Each operative assembly includes first and second gears arranged in intermeshing relationship with the driving gear mesh and another output gear mesh included in the transmission. The operative assembly further includes preload means engagably disposed between the first and second gears for imparting a spring torque to each gear mesh. The spring torque provided by the preload means has a magnitude greater than the inertia torque of either gear mesh with which it is engaged. In the preferred embodiment, the preload means includes a coil spring disposed in a manner urging the first and second gears in opposite rotational directions. By such construction, the spring torque of the spring may be readily adjusted and/or the spring may be readily replaced with another so as to match the spring loading capability to that of the gear mesh with which the operative assembly is associated. Each operative assembly may further include means for positioning the spring relative to its associated gear when the operative assembly is arranged in operative combination with the gear train.

Accordingly, the primary object of this invention is the provision of means for adding sufficient torque to the gear meshes of a manual transmission by preloading the gear meshes to overcome torsional acceleration and thereby eliminating rattle and noise.

Another object of this invention is the provision of a mechanism which imparts a spring torque to the gear meshes of a manual transmission and wherein the spring torque is greater than the inertia torque of those gear meshes.

A still further object of this invention is the provision of a mechanism for adding torque to the gear meshes of a manual transmission and which is adaptable to various applications within the transmission.

BRIEF DESCRIPTION OF THE DRAWINGS

Having in mind the above objects and other attendant advantages that would be evident from an understanding of this disclosure, the invention comprises the devices, combinations, and arrangements of parts as illustrated in the presently preferred form of the invention which is hereinafter set forth in detail to enable those skilled in the art to readily understand the function, operation, construction and advantages of same when in conjunction with the accompanying drawings in which.

DETAILED DESCRIPTION OF THE PREFERRED EMBODIMENT

Figure 1:
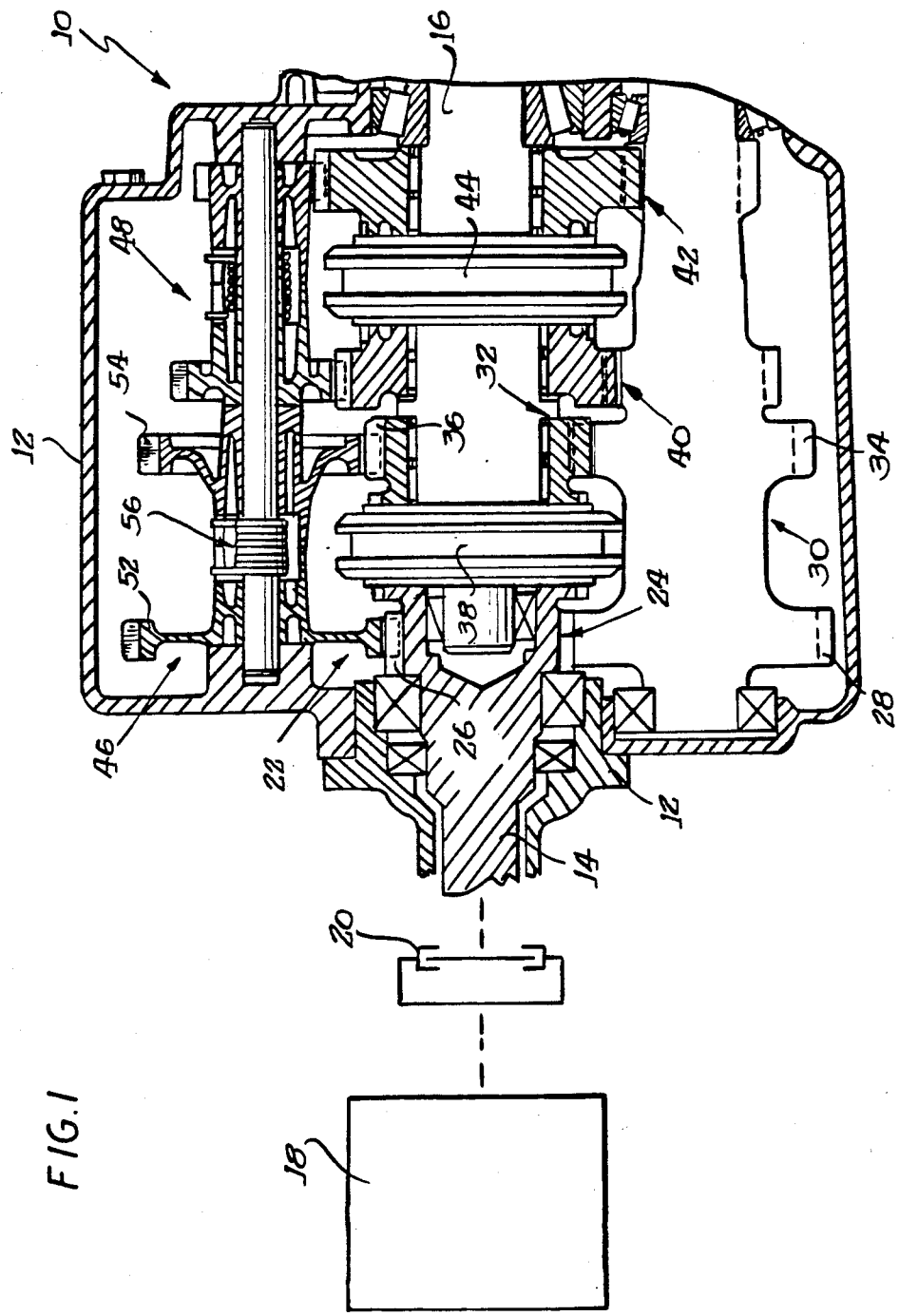
FIG. 1 is a partial longitudinal section of a shiftable transmission incorporating the teachings of the present invention.

Referring now to the drawings, wherein like reference numerals indicate like parts throughout the several views, and more particularly to FIG. 1, there is illustrated a shiftable and fully synchronized transmission 10. The transmission includes a multiple piece housing 12 having coaxially arranged input and output shafts 14, 16, respectively. Both shafts 14 and 16 are supported for rotation by housing 12 and extend therebeyond. Suitable sealant means may be provided at those locations where the shafts extend beyond the housing. The input shaft 14 is connectable to an engine 18 of the vehicle through a clutch mechanism 20 and is therefore subject to torsional accelerations.

The transmission 10 further includes a gear train 22 including a multiple ratio gear arrangement capable of developing various gear ratios; each of which are shiftable into and out of a neutral position. As it will be appreciated by those skilled in the art, any particular gear train used in the transmission will have a calculatable inertia torque when rotatably driven. The multiple ratio gear train arrangement includes at least one driving gear mesh 24 defined by an input gear 26 which connects the input shaft 14 to a gear 28 arranged on a countershaft assembly 30 and at least one other gear mesh 32 defined by a gear 34 which connects the countershaft assembly 30 with an output gear 36 which may be selectively coupled to the output shaft 16. The driving gear mesh 24 and said one other gear mesh 32 may be of conventional design and includes a synchronizing means or clutch 38 arranged in combination therewith. The transmission 10 may further include a plurality of other gear meshes or sets 40, 42 with suitable synchronizing means 44 for effecting still other gear ratios.

Having described the environment, the present invention concerns the provision of means for eliminating gear rattle in the gear train in all drive gear ratios and neutral position. As will be appreciated, such means includes one or more operative assemblies 46 and 48 which are arranged in combination with the gear sets for effecting the desired ends. In that each operative assembly will be substantially similar to the other, only the operative assembly 46 will be discussed with respect to this disclosure. In the illustrated embodiment, the operative assembly 46 is shown arranged within the upward confines of housing 12. It should be appreciated, however, that each operative assembly may comprise a collection of elements which could be assembled along with the transmission or as an independent assembly and which may be arranged in other than the illustrated position relative to the housing 12. In whatever form the operative assembly takes, it is arranged in an operative combination with the gear meshes of the transmission.

Figure 2:
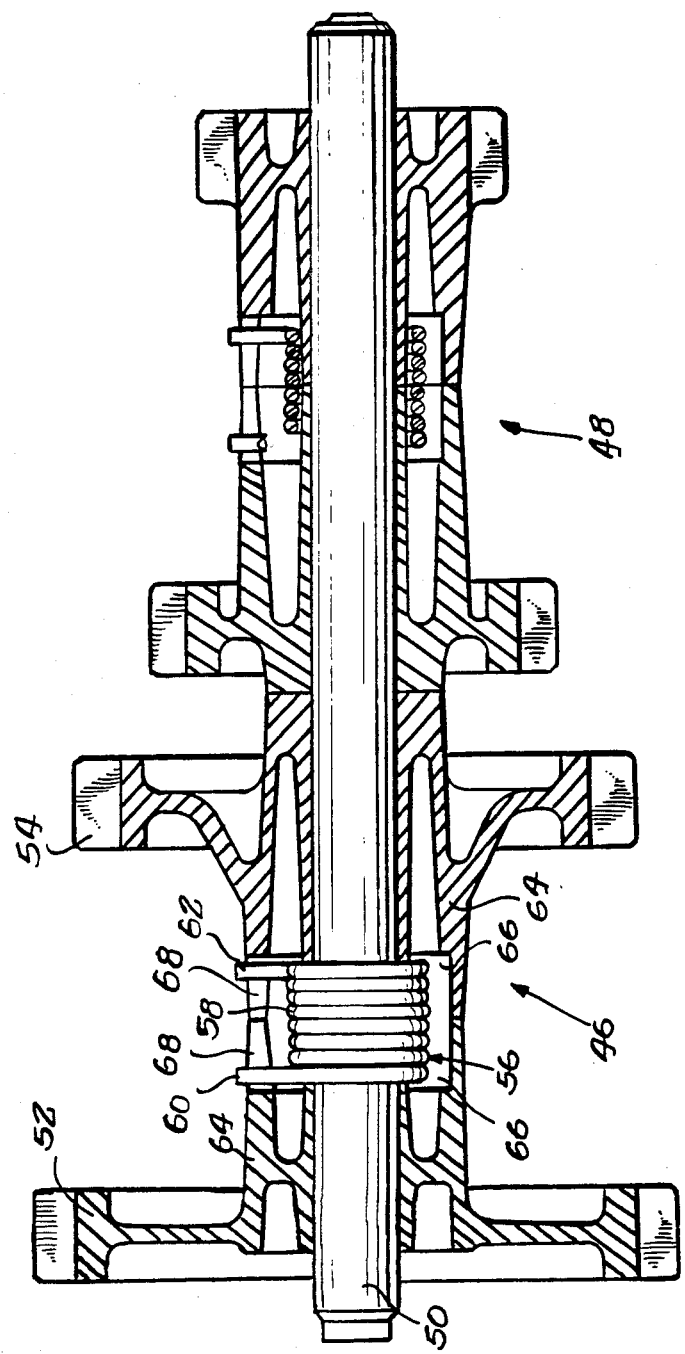
FIG. 2 is an enlarged cross-sectional view of a mechanism incorporated in the teachings of the present invention.

As may be best illustrated in FIG. 2, operative assembly 46 includes a shaft 50 having first and second axially spaced gears 52 and 54. Depending on the particular arrangement provided, shaft 50 may be permitted to rotate or alternatively, gears 52, 54 may rotate on the shaft. Either form will suffice for purposes of this invention. Gear 52 intermeshes with input 26 while gear 54 intermeshes with output gear 36 on the output shaft 16. In the embodiment shown, gear 52 is the same size and has substantially the same number of teeth as gear 28 on the countershaft assembly 30. Similarly, gear 54 is the same size and has substantially the same number of teeth as gear 34 on the countershaft assembly 30. A coil spring 56, which encircles shaft 50 is engagably disposed between gears 52 and 54 for imparting a spring torque to the gear meshes 24 and 32. The coil spring 56 is disposed in a manner urging gears 52 and 54 in opposite rotational directions.

Figure 3:
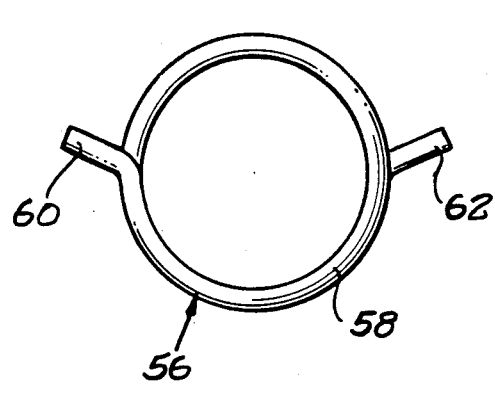
FIG. 3 is an end view of a coil spring associated with the present invention in its free state.
Figure 4:
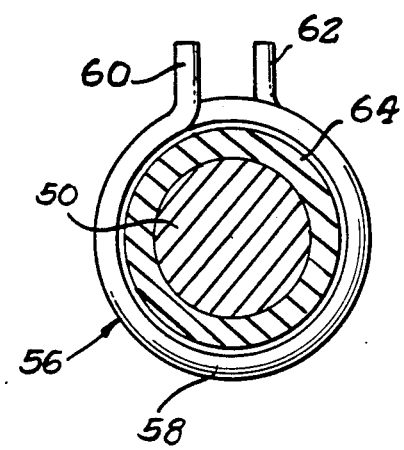
FIG. 4 is another end view of the coil spring associated with the present invention in its installed state.

As best illustrated in FIG. 3, spring 56 may be formed with a multi turn coil 58 and terminate in two ends 60 and 62. One end 60 of spring 56 is capable of engaging gear 52 and the other end 62 of spring 56 is capable of engaging gear 54.

Figure 5:
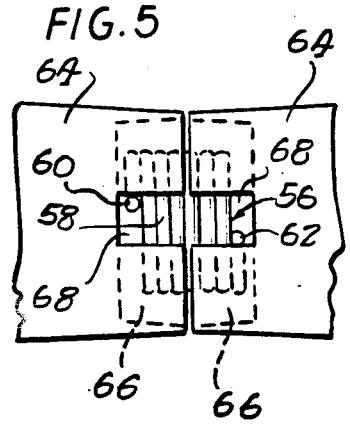
FIG. 5 is a plan view illustrating a portion of the gear hubs as they would appear arranged in the transmission.

As illustrated in FIGS. 2 and 5, each gear in an operative assembly is provided with a hub portion 64, with each hub portion including a recess 66 for accommodating at least a portion of the lateral width of spring coils 58. Each hub portion further includes a laterally extending slot or groove 68, the length of which approximately equals the depth of each recess, to receive one of the two ends 60 or 62.

Figure 6:
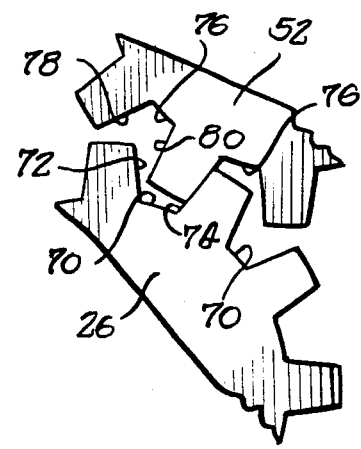
FIG. 6 is a partial end view illustrating an intermeshing relationship of the present invention with a gear mesh of the transmission.

The input gear 26 and other gears in the gear meshes are usually provided with spur or helical teeth. To allow for intermeshing engagement, gears 52 and 54 are likewise provided with corresponding shaped teeth. As seen in FIG. 6, the teeth on input gear 26 extend generally radially outward with each gear tooth having a root portion 70 disposed between two flanks 72 and 74. Likewise, the teeth on gear 52 extend radially outward with each gear tooth having a root portion 76 disposed between two flanks 78 and 80. The spring torque provided by the preload means or spring 56 causes at least one flank of substantially each tooth on gears 52, 54 to abuttingly engage at least one flank of substantially each tooth on gears 26, 34. It is important to note, additionally, that the spring torque of the preload means has a magnitude greater than the inertia torque of either of the driving or other gear meshes. Similarly, the spring torque provided by any other operative assembly has a magnitude greater than the inertia torque of the gear sets with which it is associated. By preloading the gear meshes to overcome torsional acceleration, gear rattle is eliminated rather than reduced in any gear ratio and neutral position of the transmission.

Thus, there has been provided a MECHANISM FOR ELIMINATING GEAR RATTLE IN A SHIFTABLE TRANSMISSION, which fully satisfies the objects, aims and advantages set forth above. While the invention has been described in connection with a specific embodiment thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

Thus, having adequately described my invention, what I claim is:

1. A shiftable transmission with a gear train having a calculatable inertia torque when rotatably driven, said gear train including an input shaft connectable to an engine through a clutch and is therefore subject to torsional acceleration, an output shaft, multiple ratio gearing shiftable into and out of a neutral position and including a driving gear mesh connecting said input shaft to a countershaft and at least one other gear mesh connecting the countershaft to the output shaft, and an operative assembly arrangable in operative combination with said gear train for eliminating gear rattle in any gear ratio and neutral position, said operative assembly comprising:

a shaft separate from said countershaft having a first and a second gear arranged thereon, said first and second gears being axially spaced and engagable with the driving gear mesh and said one other gear mesh, respectively, with a preload means engagably disposed between said first and second gears for imparting a spring torque to each of said gear meshes, the spring torque of said preload means having a magnitude greater than an inertia torque of either the driving or the one other gear mesh.

2. The shiftable transmission of claim 1 wherein said preload means is disposed in a manner urging said first and second gears in opposite directions of rotation.

3. The shiftable transmission of claim 1 wherein said preload means includes a coil spring encircling said shaft.

4. The shiftable transmission of claim 3 wherein said coil spring includes two ends, one end being capable of engaging said first gear and the other end being capable of engaging said second gear.

5. The shiftable transmission of claim 1 wherein said gears in said driving gear mesh and said one other gear mesh each include a plurality of helical gear teeth extending generally radially outward, with each gear tooth having a root portion disposed between a pair of tooth flanks and with said preload means causing at least one flank of substantially each tooth on said first or second gear to abuttingly engage at least one flank of substantially each tooth on said driving or said one other gear mesh.

6. The shiftable transmission of claim 1, wherein said first and second gears each have a hub extending axially inwardly toward the other gear and terminating closely adjacent each other to cooperate with said preload means.

7. A shiftable transmission with a gear train having a calculatable inertia torque when rotatably driven, said gear train including an input shaft connectable to an engine through a clutch and is therefor subject to torsional acceleration, an output shaft, multiple ratio gearing shiftable into and out of a neutral position and including a driving gear mesh connecting said input shaft to a countershaft and at least one other gear mesh connecting the countershaft to the output shaft, and an operative assembly arrangable in operative combination with said gear train for eliminating gear rattle in any gear ratio and neutral position, said operative assembly comprising:

a shaft having a first and a second gear arranged thereon, said first and second gears being engagable with the driving gear mesh and said one other gear mesh, respectively, with a preload means engagably disposed between said first and second gears for imparting a spring torque to each of said gear meshes, the spring torque of said preload means having a magnitude greater than an inertia torque of either the driving or the one other gear mesh, said preload means comprising a coil spring encircling said shaft and having two ends, one end being capable of engaging said first gear and the other end being capable of engaging said second gear, said first and second gears each having a hub with a recess receiving said coil spring and a slot communicating with said recess and receiving an end of said spring, said recesses facing each other.

* * * * *